US012634944B2

(12) United States Patent
Sun et al.

(10) Patent No.: US 12,634,944 B2
(45) Date of Patent: May 19, 2026

(54) UPLINK CONTROL CHANNEL COVERAGE ENHANCEMENT BEFORE DEDICATED CONFIGURATION

(71) Applicant: Apple Inc., Cupertino, CA (US)

(72) Inventors: Haitong Sun, Cupertino, CA (US); Huaning Niu, San Jose, CA (US); Chunxuan Ye, San Diego, CA (US); Dawei Zhang, Saratoga, CA (US); Wei Zeng, San Diego, CA (US); Xiang Chen, Campbell, CA (US); Ankit Bhamri, Bad Nauheim (DE); Jie Cui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 460 days.

(21) Appl. No.: 18/447,415

(22) Filed: Aug. 10, 2023

(65) Prior Publication Data

US 2025/0056542 A1 Feb. 13, 2025

(51) Int. Cl.
| | |
|---|---|
| *H04W 72/21* | (2023.01) |
| *H04L 1/1812* | (2023.01) |
| *H04W 74/08* | (2024.01) |
| *H04W 74/0833* | (2024.01) |

(52) U.S. Cl.
CPC ........... H04W 72/21 (2023.01); H04L 1/1812 (2013.01); H04W 74/0833 (2013.01)

(58) Field of Classification Search
CPC ....... H04L 1/1896; H04L 1/1858; H04L 1/08; H04L 1/1812; H04L 5/1469; H04W 74/0833; H04W 72/21
See application file for complete search history.

(56) References Cited

U.S. PATENT DOCUMENTS

| | | | | |
|---|---|---|---|---|
| 2022/0361202 A1* | 11/2022 | Yi | .......................... | H04W 24/10 |
| 2022/0385381 A1* | 12/2022 | MolavianJazi | ....... | H04W 52/48 |
| 2024/0049235 A1* | 2/2024 | Lim | .......................... | H04L 1/08 |
| 2024/0073923 A1* | 2/2024 | Lim | ..................... | H04B 7/0404 |
| 2024/0244472 A1* | 7/2024 | Lyu | ........................ | H04L 5/0055 |
| 2024/0380524 A1* | 11/2024 | Marcone | ........... | H04W 74/0833 |
| 2025/0167946 A1* | 5/2025 | Lim | ...................... | H04L 5/0023 |

OTHER PUBLICATIONS

International Search Report and Written Opinion for PCT/US2024/041635; Oct. 25, 2024.
(Continued)

*Primary Examiner* — Brian D Nguyen
(74) *Attorney, Agent, or Firm* — Kowert, Hood, Munyon, Rankin & Goetzel, P.C.

(57) ABSTRACT

This disclosure relates to techniques for performing physical uplink control channel repetitions before dedicated physical uplink control channel resource configuration in a wireless communication system. A wireless device may receive configuration information indicating that physical uplink control channel repetition before dedicated physical uplink control channel resource configuration is supported. The wireless device may perform a physical uplink control channel transmission with repetition before dedicated physical uplink control channel resource configuration based at least in part on the configuration information.

20 Claims, 5 Drawing Sheets

Receive configuration information indicating that PUCCH repetition before dedicated PUCCH resource configuration is supported
502

Perform PUCCH transmission with repetition before dedicated PUCCH resource configuration is performed based at least in part on the configuration information
504

(56) References Cited

OTHER PUBLICATIONS

Moderator (NTT Docomo et al.) "Summary EOM on 9.9.1 Coverage enhancement for NR NTN"; 3GPP TSG RAN WG1 #113 R1-2306228; May 22, 2023.

Moderator (NTT Docomo et al.) "Summary #3 on 9.9.1 Coverage enhancement for NR NTN"; 3GPP TSG RAN WG1 #113 R1-2306024; May 22, 2023.

Qualcom Inc "Coverage enhancements for NR NTN"; 3GPP 3GPP TSG RAN WG1 #113 R1-2305352; May 22, 2023.

Panasonic "Discussion on coverage enhancement for NR-NTN"; 3GPP TSG RAN WG1 #113 R1-2305699; May 22, 2023.

NTT Docom et al. "Discussion on coverage enhancement for NR NTN"; 3GPP TSG RAN WG1 #113 R1-2305611; May 22, 2023.

ZTE "Discussion on coverage enhancement for NTN"; 3GPP TSG RAN WG1 #113 R1-2305556; May 22, 2023.

CATT "Further discussion on UL coverage enhancement for NR NTN"; 3GPP TSG RAN WG1 #113 R1-2304751; May 22, 2023.

* cited by examiner

UPLINK CONTROL CHANNEL COVERAGE ENHANCEMENT BEFORE DEDICATED CONFIGURATION

FIELD

The present application relates to wireless communications, and more particularly to systems, apparatuses, and methods for performing robust uplink control channel transmission before dedicated configuration in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus, it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for robust uplink control channel transmission before dedicated configuration in a wireless communication system.

According to the techniques described herein, a cellular base station may provide configuration information indicating whether physical uplink control channel repetition is supported before dedicated physical uplink control channel resource configuration is performed. The configuration information may indicate various aspects of the repetition configuration, for example including under which circumstances before dedicated configuration the repetition is supported, and various details of how to perform the repetitions.

Based on the configuration information, a wireless device may perform a physical uplink control channel transmission with repetition before dedicated physical uplink control channel resource configuration is performed for the wireless device. The wireless device may perform such a transmission to respond to (e.g., to acknowledge) a message 4 of a random access channel procedure, and/or for another uplink transmission before dedicated physical uplink control channel resource configuration is performed for the wireless device.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
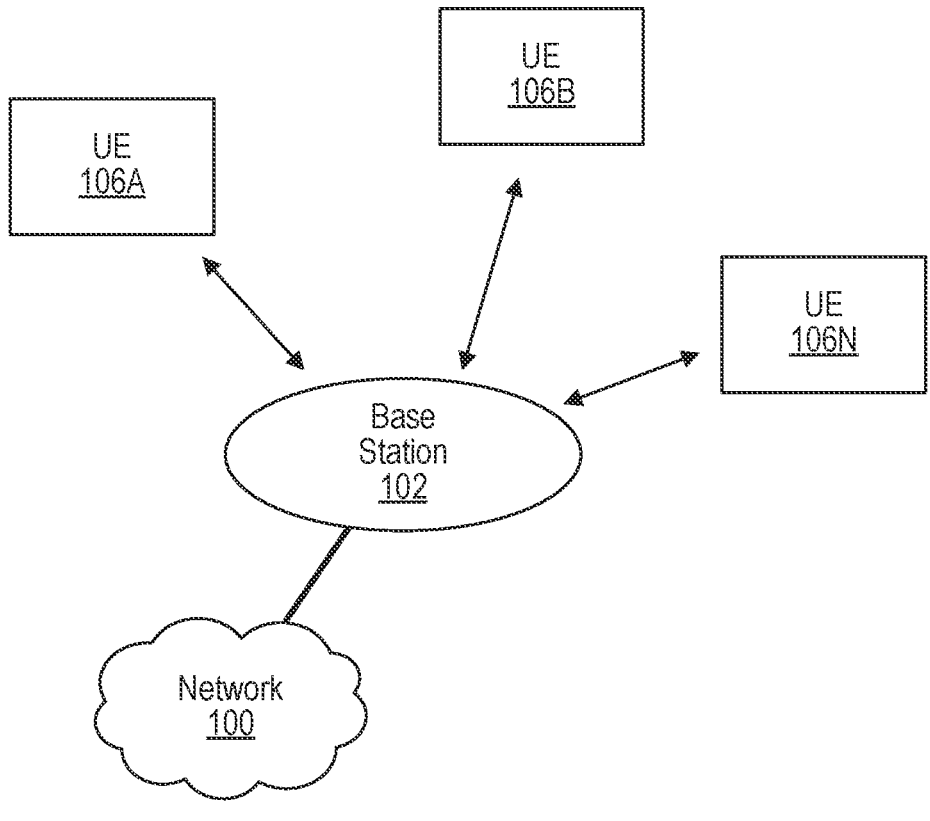
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment

RF: Radio Frequency

BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well as any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
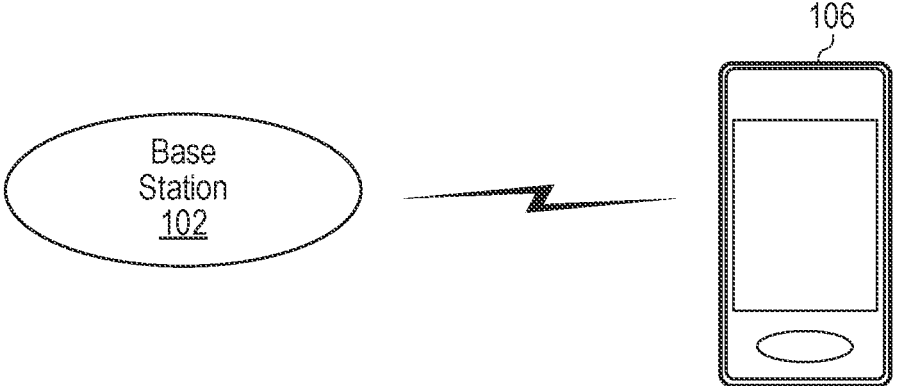
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

Note that, at least in some 3GPP NR contexts, base station (gNB) functionality can be split between a centralized unit (CU) and a distributed unit (DU). The illustrated base station 102 may support the functionality of either or both of a CU or a DU, in such a network deployment context, at least according to some embodiments. In some instances, the base station 102 may be configured to act as an integrated access and backhaul (IAB) donor (e.g., including IAB donor CU and/or IAB donor DU functionality). In some instances, the base station 102 may be configured to act as an IAB node (e.g., including IAB mobile termination (MT) and IAB-DU functionality). Other implementations are also possible.

The base station 102 and the user devices may be configured to communicate over the transmission medium using any of various radio access technologies (RATs), also referred to as wireless communication technologies, or telecommunication standards, such as LTE, LTE-Advanced (LTE-A), LAA/LTE-U, 5G NR, Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for robust uplink control channel transmission before dedicated configuration in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or NR, and separate radios for communicating using each of Wi-Fi and BLUETOOTH™. Other configurations are also possible.

Figure 3:
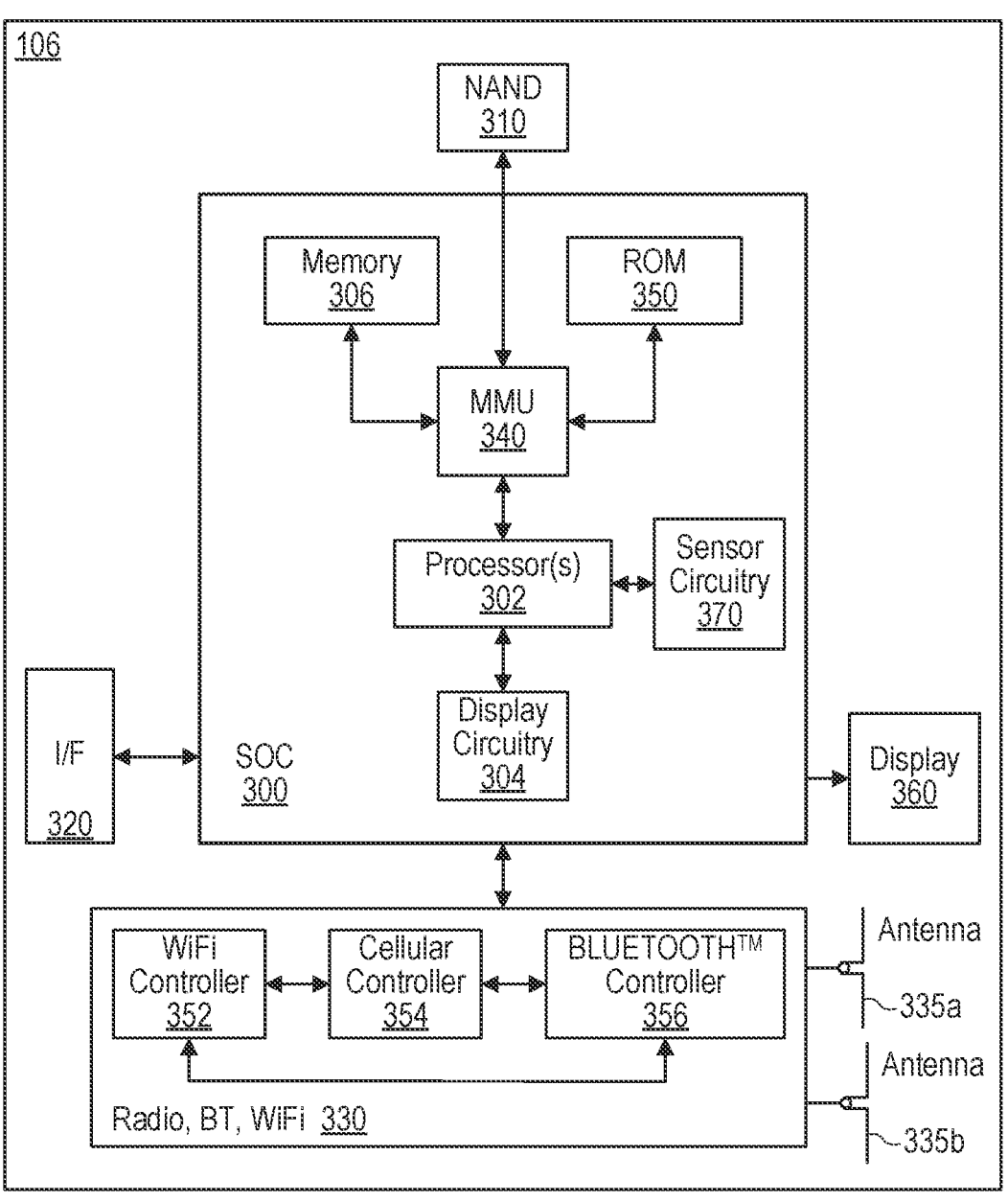
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. Some or all of the various illustrated components (and/or other device components not illustrated, e.g., in variations and alternative arrangements) may be "communicatively coupled" or "operatively coupled," which terms may be taken herein to mean components that can communicate, directly or indirectly, when the device is in operation.

As shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, BLUETOOTH™, Wi-Fi, GPS, etc.). The UE device 106 may include or couple to at least one antenna (e.g., 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. The communication circuitry may include multiple receive chains and/or multiple transmit chains for receiving and/or transmitting multiple spatial streams, such as in a multiple-input multiple output (MIMO) configuration. As noted above, the UE may be configured to communicate wirelessly using multiple wireless communication standards in some embodiments.

The UE 106 may include hardware and software components for implementing methods for the UE 106 to perform techniques for robust uplink control channel transmission before dedicated configuration in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for robust uplink control channel transmission before dedicated configuration in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
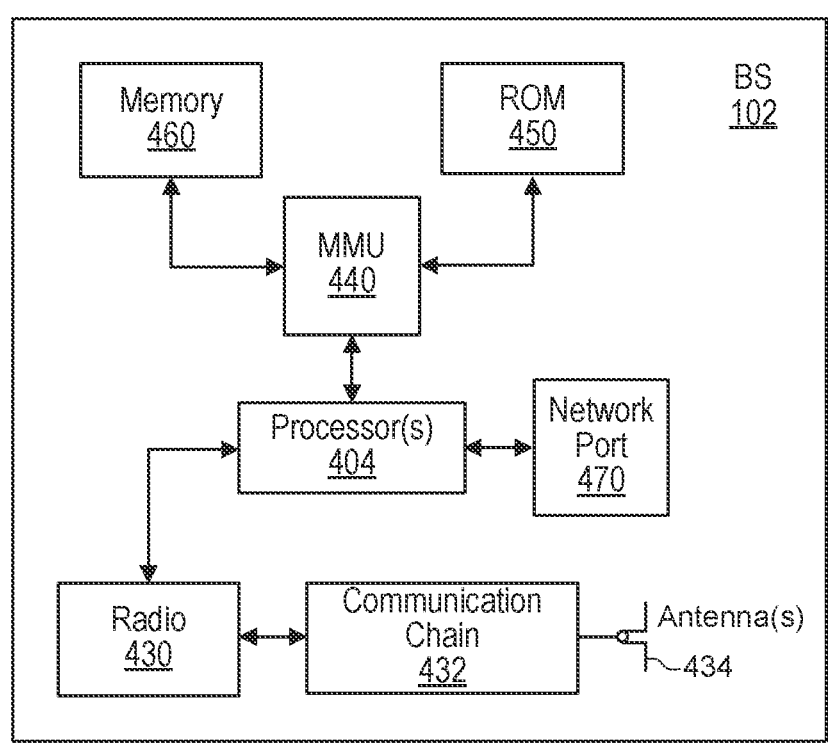
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, 5G NR, 5G NR SAT, LTE, LTE-A, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, 5G NR SAT and Wi-Fi, LTE and Wi-Fi, etc.).

As described further subsequently herein, the BS 102 may include hardware and software components for implementing or supporting implementation of features described herein. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network(s), e.g., it may include at least one Ethernet port, and radio 430 may be designed to communicate according to the Wi-Fi standard.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
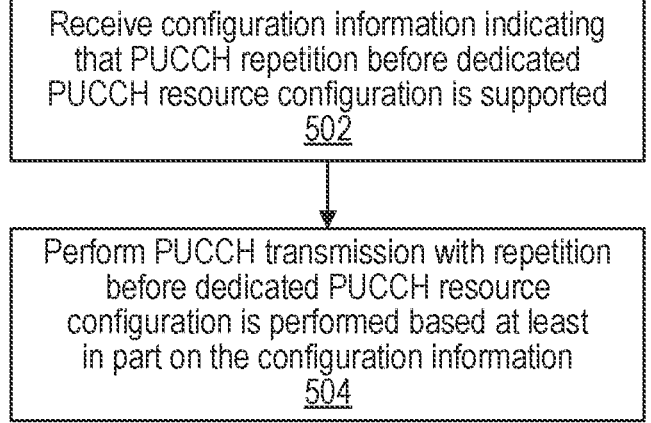
FIG. 5 is a flowchart diagram illustrating aspects of an exemplary possible method for robust uplink control channel transmission before dedicated configuration in a wireless communication system, according to some embodiments.

FIG. 5—Robust Uplink Control Channel Transmission Before Dedicated Configuration In 3GPP NR, after dedicated radio resource control (RRC) configuration of physical uplink control channel (PUCCH) resources, it may be possible to configure a wireless device with PUCCH slot aggregation, which may improve the robustness of the PUCCH transmission. This may be useful in at least some circumstances, such as for cell edge scenarios, or possibly for satellite based cells, among various possibilities.

Such coverage enhancement may also be useful before dedicated PUCCH resource configuration occurs. For example, PUCCH repetition could be used when responding to the message 4 of a random access channel (RACH) procedure to establish a RRC connection, when responding to the dedicated RRC PUCCH resource configuration, or when performing any other PUCCH transmission before dedicated RRC PUCCH resource configuration is complete. For limited coverage scenarios and potentially more generally, such coverage enhancement may increase the likelihood of successfully completing the RACH procedure and avoiding early RRC failure, at least in some embodiments.

Thus, it may be beneficial to specify techniques for robust uplink control channel transmission before dedicated configuration. To illustrate one such set of possible techniques, FIG. 5 is a flowchart diagram illustrating a method for robust uplink control channel transmission before dedicated configuration in a wireless communication system, at least according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

The wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology, according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

In 502, the wireless device may receive configuration information indicating that PUCCH repetition before dedicated PUCCH resource configuration is supported. The configuration information may include information provided by the cellular base station in broadcast system information (e.g., in one or more system information blocks or SIBs). Additionally, or alternatively, the configuration information may include information provided by the cellular base station when scheduling a PUCCH transmission, for example in downlink control information (DCI) that provides a PUCCH resource for uplink transmission of an acknowledgement frame. Note also that at least some of the information for configuring PUCCH repetition before dedicated PUCCH resource configuration that is described herein as potentially being provided by the cellular base station could alternatively or additionally be fixed in technical specifications for the wireless communication technology used by the wireless device and the cellular base station to communicate (e.g., 3GPP technical specifications, as one possibility).

The configuration information may indicate support for PUCCH repetition before dedicated PUCCH resource configuration in any of a variety of scenarios and with any of a variety of parameters, according to various embodiments. As one such aspect, the configuration information may include one or more PUCCH repetition values for one or more PUCCH resource indexes. This may indicate how many repetitions are supported for each of the PUCCH resources associated with those PUCCH resource indexes. In some embodiments, one repetition value may be configured for multiple (and potentially all) PUCCH resource indexes. As another possibility, a PUCCH repetition value can be configured for each possible PUCCH resource index.

As another possible aspect, the configuration information may configure whether PUCCH repetition before dedicated PUCCH resource configuration is supported for one or more types of PUCCH scheduling signaling. For example, the configuration information may indicate whether PUCCH repetition before dedicated PUCCH resource configuration is supported when physical downlink shared channel (PDSCH) scheduling by downlink control information format 1_0 with cyclic redundancy check scrambled by one or more of cell radio network temporary identifier (C-RNTI), temporary C-RNTI (TC-RNTI), configured scheduling RNTI (CS-RNTI), or modulation and coding scheme C-RNTI (MCS-C-RNTI). As one possibility, the repetition can be supported only for PDSCH scheduled by DCI format 1_0 with CRC scrambled by TC-RNTI. As another possibility, the repetition can also be supported for PDSCH scheduled by DCI format 1_0 with CRC scrambled by C-RNTI, CS-RNTI, or MCS-C-RNTI.

As yet another possible aspect, the configuration information may configure whether PUCCH repetition before dedicated PUCCH resource configuration is supported for one or more types of PUCCH formats. For example, the configuration information may indicate whether PUCCH repetition before dedicated PUCCH resource configuration is supported for either or both of PUCCH format 0 or PUCCH format 1.

As still another possible aspect, the configuration information may configure one or more of slot based PUCCH repetition before dedicated PUCCH resource configuration or sub-slot based PUCCH repetition before dedicated PUCCH resource configuration. Note that for sub-slot based PUCCH repetition, it may be the case that each slot can be divided into multiple sub-slots, and that PUCCH transmissions are repeated in multiple sub-slots. In this case, in each sub-slot, the PUCCH may be transmitted with the same relative symbol location and duration, at least in some instances. According to various embodiments, it may be possible that only slot based PUCCH repetition is supported before dedicated PUCCH resource configuration, or that both slot based PUCCH repetition and sub-slot based PUCCH repetition are supported before dedicated PUCCH resource configuration.

In some instances, an indication to perform PUCCH repetition before dedicated PUCCH resource configuration can be provided dynamically, e.g., in DCI that schedules a PUCCH transmission. For each such PUCCH resource scheduled, the corresponding number of repetitions can be configured by the network in system information, or can be determined based on 3GPP technical specifications, according to various embodiments.

The wireless device may provide wireless device capability information to the cellular base station indicating whether the wireless device supports PUCCH repetition before dedicated PUCCH resource configuration, in some embodiments. For example, when performing a RACH procedure to establish a RRC connection, such reporting may be provided in a message 1 or message 3 physical uplink shared channel (PUSCH) transmission of the RACH procedure, at least in some embodiments.

In some embodiments, repetition may be supported for PUCCH transmission before dedicated PUCCH resource configuration (e.g., common PUCCH resource transmission) for either or both of PUCCH transmission for responding to a message 4 of a RACH procedure or PUCCH transmission after responding to a message 4 of a RACH procedure.

Such cases may be enabled and possibly configured together, or may be enabled and/or configured independently/separately. In some embodiments, such cases may not be considered distinctly, and configuration information from the cellular base station may apply to both cases together. In some embodiments, it may be the case such cases can be enabled separately, but that repetition for PUCCH transmission after responding to a message 4 of a RACH procedure can only be enabled if repetition for PUCCH transmission for responding to a message 4 of a RACH procedure is enabled.

In such a scenario, when repetition is supported/enabled for repetition for PUCCH transmission for responding to a message 4 of a RACH procedure, it may be possible that full configuration details (e.g., number of repetitions, slot or sub-slot based repetition, applicable PUCCH resource(s), applicable PUCCH format(s), etc.) are provided for that case, while for repetition for PUCCH transmission after responding to a message 4 of a RACH procedure, when such repetition is supported/enabled, it may be possible that configuration details are not independently provided and that the configuration details for that case follow the configuration details provided for repetition for PUCCH transmission for responding to a message 4 of a RACH procedure. In other words, the same configuration parameters may be used for PUCCH repetition for PUCCH transmission after responding to a message 4 of a RACH procedure as for PUCCH repetition for PUCCH transmission for responding to a message 4 of a RACH procedure in such a scenario.

Alternatively, it may be possible that full or differential configuration details (e.g., number of repetitions, slot or sub-slot based repetition, applicable PUCCH resource(s), applicable PUCCH format(s), etc.) are provided for repetition for PUCCH transmission after responding to a message 4 of a RACH procedure, even if such repetition can only be enabled if repetition for PUCCH transmission for responding to a message 4 of a RACH procedure is enabled. As a still further possibility, such cases can be enabled independently (e.g., it may be possible to enable repetition for PUCCH transmission after responding to a message 4 of a RACH procedure even if repetition for PUCCH transmission for responding to a message 4 of a RACH procedure is not enabled), potentially with fully independent/separate configurations.

For scenarios in which the wireless device provides wireless device capability information to the cellular base station indicating whether the wireless device supports PUCCH repetition before dedicated PUCCH resource configuration, such an indication may apply to both repetition for PUCCH transmission for responding to a message 4 of a RACH procedure and repetition for PUCCH transmission after responding to a message 4 of a RACH procedure. Alternatively, it may be possible that the wireless device can independently report whether the wireless device supports PUCCH transmission repetition for responding to a message 4 of a RACH procedure, as well as whether the wireless device supports PUCCH transmission repetition after responding to a message 4 of a RACH procedure and before dedicated PUCCH resource configuration.

In 504, the wireless device may perform PUCCH transmission with repetition before dedicated PUCCH resource configuration is performed, based at least in part on the configuration information. For example, the PUCCH transmission with repetition may be performed using a number of repetitions, using slot or sub-slot based repetition, and/or for an applicable PUCCH resource and PUCCH format, in accordance with the provided configuration information.

The PUCCH transmission with repetition may include hybrid automatic repeat request (HARQ) acknowledgement (ACK) information for a message 4 of a RACH procedure, as one possibility. As another possibility, the PUCCH transmission with repetition may be performed after HARQ-ACK information is provided for a message 4 of a RACH procedure and before dedicated PUCCH resource configuration is performed for the wireless device.

In some embodiments, the PUCCH transmission with repetition may be performed in frequency division duplexing (FDD) spectrum, which may also be referred to as paired spectrum, such that a dedicated uplink frequency channel may be available, which may be separate from a dedicated downlink frequency channel. In such a scenario, the repetitions of the PUCCH transmission may be performed in multiple consecutive slots or sub-slots.

In some embodiments, the PUCCH transmission with repetition may be performed in time division duplexing (TDD) spectrum, which may also be referred to as unpaired spectrum, such that a frequency channel may be shared between uplink and downlink use, with certain slots or symbols within slots being scheduled for downlink or uplink communication. In such a scenario, the repetitions of the PUCCH transmission may be performed in multiple consecutive slots or sub-slots, with repetitions omitted when a slot or sub-slot has a duplexing direction conflict, as one possibility. As another possibility, in such a scenario, repetitions of the PUCCH transmission may be performed in multiple consecutive slots or sub-slots that do not have a duplexing direction conflict.

In some embodiments, for TDD spectrum, when a PUCCH transmission repetition slot or sub-slot has a duplexing direction conflict, it may be the case that all symbols in the slot or sub-slot are omitted. As another possibility, all symbols after the first symbol of the slot or sub-slot with the duplexing direction conflict may be omitted. As yet another possibility, only symbols of the slot or sub-slot with the duplexing direction conflict may be omitted. After the slot or sub-slot with the duplexing direction conflict, it may be the case that any following repetitions for the PUCCH transmission are transmitted without impact from the slot or sub-slot with the duplexing direction conflict. Alternatively, all following repetitions for the PUCCH transmission may be omitted in such a scenario.

The wireless device may determine when TDD duplexing direction conflict occurs based at least in part on configuration information received from the cellular base station. Note, though, that there may be multiple possibilities for how the wireless device determines when TDD duplexing direction conflict occurs. In some embodiments, it may be possible that only TDD-UL-DL-ConfigCommon in Serving-CellConfigCommonSIB is considered to identify duplexing direction conflicts. In some embodiments, it may be possible that TDD-UL-DL-ConfigCommon in ServingCellConfig-Common is also considered.

For the flexible symbol "F" in a TDD spectrum deployment, it may be possible that the wireless device considers such a symbol as being in duplex direction conflict with PUCCH transmission. Alternatively, it may be possible that the wireless device considers such a symbol as not being in duplex direction conflict with PUCCH transmission.

In some embodiments, it may be possible that the configuration information indicates to the wireless device how to handle some or all aspects of handling TDD duplexing direction conflict in conjunction with performing PUCCH transmission repetitions before dedicated PUCCH resource configuration. Alternatively, or additionally, it may be possible that some or all aspects of such handling may be left to wireless device implementation.

Thus, at least according to some embodiments, the method of FIG. 5 may be used to provide a framework according to which a wireless device can perform robust uplink control channel transmission before dedicated configuration. Such operation may help reduce RRC connection establishment failures and other RRC failures in marginal uplink conditions, which may improve wireless device service quality, reduce wireless device power consumption, and/or provide any of a variety of other possible benefits, at least in some instances.

Figure 6:
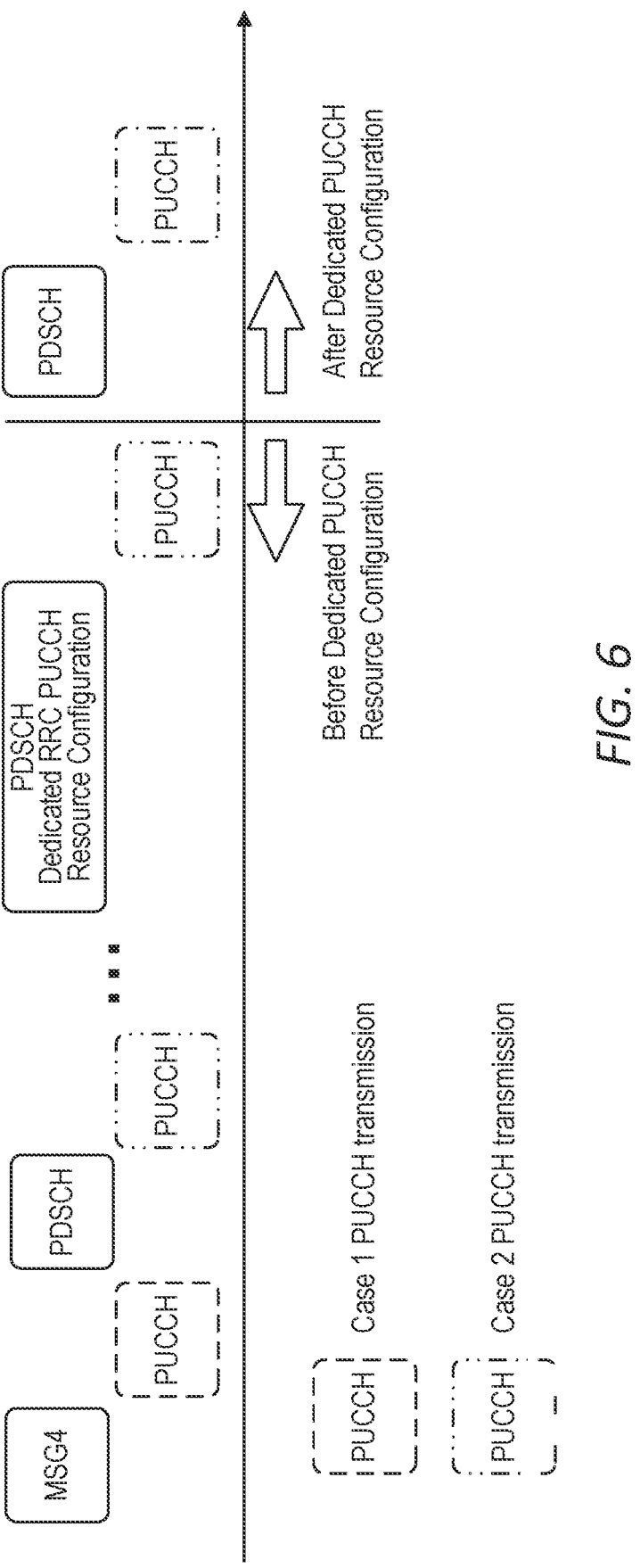
FIG. 6 is a timing diagram illustrating PUCCH transmission scenarios before and after dedicated configuration, according to some embodiments.
Figure 7:
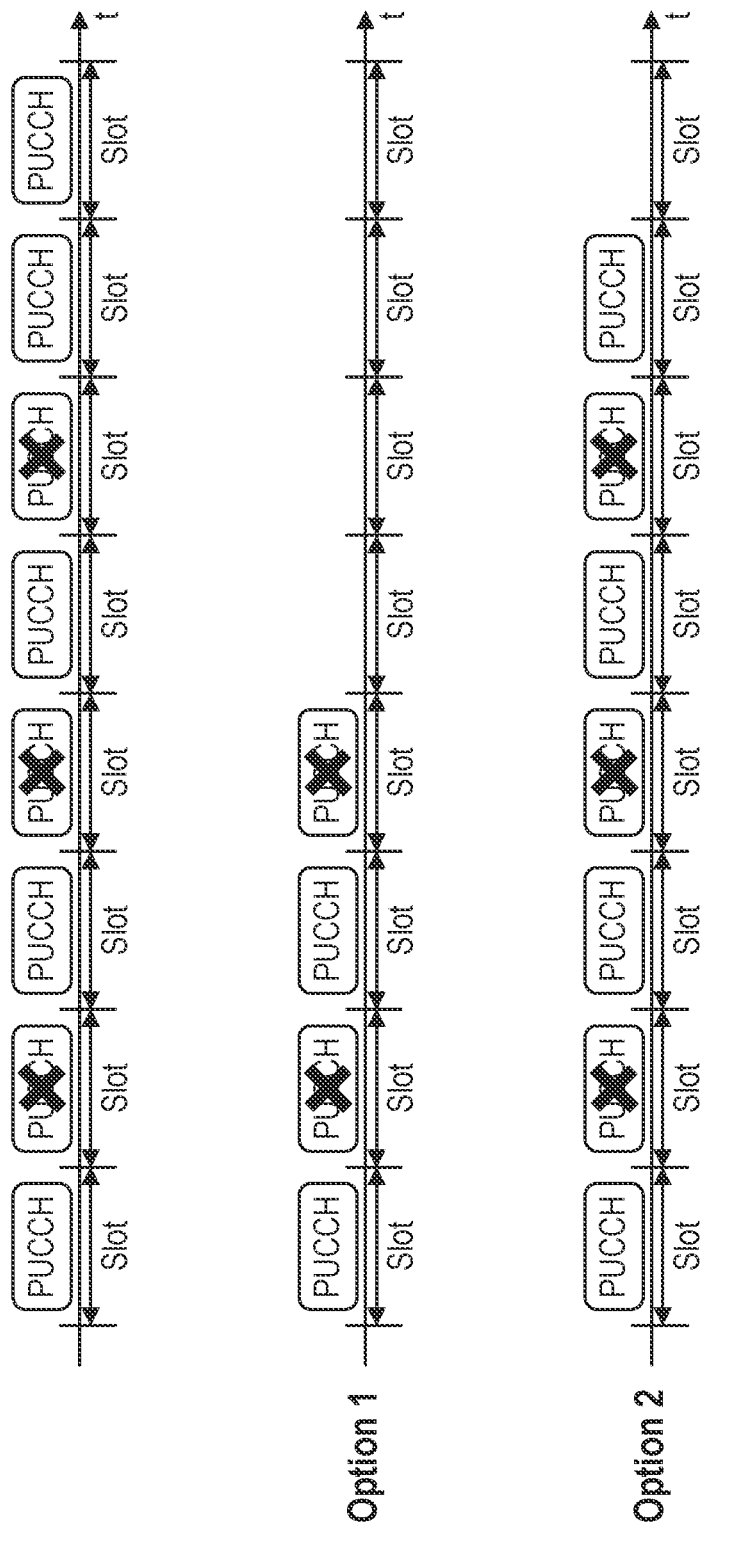
FIG. 7 illustrates aspects of multiple possible PUCCH repetition configuration options in a time division duplexing context, according to some embodiments.

FIGS. 6-7 and Additional Information

FIGS. 6-7 illustrate further aspects that might be used in conjunction with the method of FIG. 5 if desired. It should be noted, however, that the exemplary details illustrated in and described with respect to FIGS. 6-7 are not intended to be limiting to the disclosure as a whole: numerous variations and alternatives to the details provided herein below are possible and should be considered within the scope of the disclosure.

In 3GPP NR, after dedicated RRC configuration, it may be the case that a network can configure physical uplink control channel (PUCCH) slot aggregation, e.g., to provide PUCCH coverage enhancement. PUCCH slot aggregation may allow the PUCCH to be transmitted in multiple slots to improve coverage. The network can use dedicated RRC configuration for PUCCH slot aggregation; for example, 3GPP Release 15 supports such configuration using UplinkConfig→BWP-UplinkDedicated→PUCCH-Config-→PUCCH-FormatConfig→nrofSlots, and 3GPP Release 17 supports such configuration using UplinkConfig→BWP-UplinkDedicated→PUCCH-Config→PUCCH-Resource-Ext-v1610→pucch-RepetitionNrofSlots-r17.

In NR, before dedicated RRC configuration, it may be the case that the UE uses the PUCCH resource that is configured in system information block (SIB) 1: SIB1→servingCellConfigCommon→uplinkConfigCommon→BWP-UplinkCommon→PUCCHConfigCommon. In this case, currently, no slot aggregation (and thus no PUCCH coverage enhancement) may be supported.

However, it may be beneficial to support such PUCCH coverage enhancement prior to dedicated PUCCH configuration, at least in some instances. For example, in cell edge scenarios, and/or for satellite based cells, PUCCH repetition for message 4 (or "msg4") transmission may improve the likelihood of successful random access channel (RACH) procedure competition. Accordingly, it may be useful to provide design aspects to support PUCCH slot aggregation, and such techniques, both for msg4 hybrid automatic repeat request (HARQ) acknowledgement (ACK) PUCCH transmission and for other PUCCH transmission before dedicated PUCCH resource configuration. Such design aspects may include PUCCH repetition configuration choices, options for configuring two different common PUCCH, e.g., with repetition separately configurable for the different common PUCCHs, and UE capability reporting in conjunction with PUCCH transmission before dedicated PUCCH resource configuration.

For PUCCH coverage enhancement (e.g., PUCCH repetition), common PUCCH resource transmission before dedicated RRC configuration can be separated into two cases, at least according to some embodiments. FIG. 6 is a timing diagram illustrating aspects of an example scenario including both such cases, according to some embodiments. As shown, a first case ("case 1") may include PUCCH transmission for msg4, i.e., the HARQ ACK response to the physical downlink shared channel (PDSCH) transmission with UE contention resolution identity. A second case ("case 2") may include any other PUCCH transmission before dedicated RRC PUCCH resource configuration, but after PUCCH transmission for the msg4. As shown, this second case may include any PUCCH transmissions after the PUCCH transmission for the msg4 up to and including the PUCCH acknowledgement to the PDSCH transmission that includes the dedicated RRC PUCCH resource configuration. As further shown, any PUCCH transmissions after the dedicated RRC PUCCH resource configuration is acknowledged may use the dedicated PUCCH resource configuration, at least according to some embodiments.

Given such a distinction between pre-dedicated PUCCH resource configuration cases, it may be possible that only case 1 PUCCH transmission (i.e., PUCCH transmission for msg4) supports PUCCH repetition, or that both case 1 and case 2 PUCCH transmission supports PUCCH repetition. In some embodiments, the network may be able to configure PUCCH repetition before dedicated PUCCH resource configuration by way of a SIB. In some instances, the SIB may configure a single PUCCH repetition value. Alternatively, different PUCCH repetition values may be SIB configured for different PUCCH resources, which may for example be defined in Table 9.2.1-1 in 3GPP TS 38.213 v.17.6.0. Note that the same or different approaches can be used for case 1 and case 2 PUCCH transmission; thus, SIB configuration could provide a single PUCCH repetition value for case 1 PUCCH transmission and different repetition values for different PUCCH resources for case 2 PUCCH transmission, or vice versa, according to various embodiments.

In some embodiments, for a common PUCCH resource before dedicated RRC configuration, PUCCH repetition can be supported for any or all of PDSCH scheduled by downlink control information (DCI) format 1_0 with cyclic redundancy code (CRC) scrambled by cell radio network identifier (C-RNTI), PDSCH scheduled by DCI format 1_0 with CRC scrambled by temporary C-RNTI (TC-RNTI), PDSCH scheduled by DCI format 1_0 with CRC scrambled by configured scheduling RNTI (CS-RNTI), or PDSCH scheduled by DCI format 1_0 with CRC scrambled by modulation and coding scheme C-RNTI (MCS-C-RNTI).

In some embodiments, it may be possible that PUCCH repetition for common PUCCH resources before dedicated RRC configuration can be indicated dynamically by way of DCI. For example, using the PUCCH resource indicator, which may be a 3 bit field as defined in 3GPP TS 38.213 v.17.6.0 clause 9.2.3, for each PUCCH resource, the corresponding number of repetitions can be either hardcoded in the specification or configured by the network in a SIB.

In some embodiments, it may be possible that PUCCH repetition for common PUCCH resources before dedicated RRC configuration is supported only for PUCCH format 0. Alternatively, it may be possible that PUCCH repetition for common PUCCH resources before dedicated RRC configuration is supported for both PUCCH format 0 and PUCCH format 1.

PUCCH repetition for common PUCCH resources before dedicated RRC configuration may be supported only for slot based PUCCH repetition, in some instances. For slot based PUCCH repetitions, PUCCH transmissions may be repeated in multiple slots. In each slot, the PUCCH may be transmitted with the same relatively symbol location and duration. Alternatively, it may be possible that sub-slot based PUCCH repetition is also supported. In this case, each slot may be divided into multiple sub-slots; for example, a 14 symbol slot could be divided into 2 sub-slots, with each sub-slot having 7 symbols. Other sub-slot formats are also possible. PUCCH transmissions can thus be repeated in multiple sub-slots, if this form of PUCCH repetition is supported. In each sub-slot, the PUCCH may be transmitted with the same relative symbol location and duration. Note that the sub-slot configuration can be provided by RRC in SIB, at least according to some embodiments.

For frequency division duplexing (FDD) deployments (paired spectrum), the PUCCH transmissions may be repeated in multiple consecutive slots or sub-slots when PUCCH repetition is configured for common PUCCH resources before dedicated RRC configuration. For time division duplexing (TDD) deployments (unpaired spectrum), the PUCCH transmissions may be repeated in multiple consecutive slots or sub-slots when PUCCH repetition is configured for common PUCCH resources before dedicated RRC configuration, with the PUCCH transmission, in a particular slot/sub-slot being omitted when there is a duplexing direction conflict, as one option ("option 1"). As another option for TDD deployments ("option 2"), the PUCCH transmissions may be repeated in multiple slots/sub-slots that have no duplexing direction conflict. Note that the number of consecutive slots/sub-slots can be either RRC configured in SIB or dynamically indicated by a DCI field, according to various embodiments.

FIG. 7 illustrates aspects of such possible PUCCH repetition configuration options in an example time division duplexing scenario, according to some embodiments. In the illustrated scenario, the network may configure a UE to repeat the PUCCH over 4 slots. In the "option 1" approach, the UE may transmit the PUCCH in the first and third slots, but may omit the PUCCH transmission in the second and fourth slots due to duplexing direction conflict. In the "option 2" approach, the UE may transmit the PUCCH in the first, third, fifth, and seventh slots, as those may be the first four slots with no duplexing direction conflict.

For such PUCCH repetition in TDD spectrum before dedicated RRC configuration, to determine when duplexing direction conflict exists for a slot, it may be the case that only the configuration information TDD-UL-DL-ConfigCommon in ServingCellConfigCommonSIB is considered. Alternatively, it may be the case that both TDD-UL-DL-Config-Common in ServingCellConfigCommonSIB and TDD-UL-DL-ConfigCommon in ServingCellConfigCommon are considered. With respect to use of flexible symbol "F," in terms of determining whether duplexing direction conflict exists, it may be the case that the "F" symbol is considered as a duplex direction conflict with PUCCH transmission. Alternatively, it may be possible that the "F" symbol is not considered as a duplex direction conflict with PUCCH transmission.

In some instances, for common PUCCH resources before dedicated RRC configuration, for PUCCH repetition in TDD spectrum, when duplexing direction conflict is detected for one or multiple symbols for PUCCH transmission in a slot or sub-slot, there may be multiple options for handling the PUCCH transmission in the corresponding slot/sub-slot. As one option, in such a scenario, all of the symbols in the slot/sub-slot may be omitted. As another option, all of the symbols after the first detected conflict may be omitted, including the symbols with conflict. As still another option, only the symbols that have detected conflict may be omitted. There may also be multiple options for handling any PUCCH transmissions in the following slot/sub-slot. As one such option, the following PUCCH transmission(s) may not be impacted because of a detected duplexing direction conflict in a previous slot/sub-slot. As another option, all of the following PUCCH transmissions may be omitted after a detected duplexing direction conflict in a previous slot/sub-slot.

As previously noted, it may be possible that for PUCCH coverage enhancement (PUCCH repetition) for common PUCCH resource transmission before dedicated RRC configuration, such PUCCH transmissions may be categorized into two different cases, including PUCCH transmission for msg4 (for PDSCH with UE contention resolution identity), which may also be referred to as "case 1," and other PUCCH transmissions before dedicated RRC PUCCH resource configuration, but after PUCCH transmission for msg4, which may also be referred to as "case 2." Given such categorization, it may be possible that PUCCH repetitions can be configured simultaneously for both of these cases, or that PUCCH repetition can be configured differently for these cases. In some embodiments, it may be the case that, when PUCCH repetitions can be configured differently for case 1 and case 2, PUCCH repetition for case 2 can only be configured if PUCCH repetition is configured for case 1. Alternatively, it may be possible that PUCCH repetition for case 1 and case 2 can be enabled/configured/disabled independently. In some instances, it could be possible that PUCCH repetition for case 2 can only be enabled or disabled, and that once enabled, the detailed PUCCH repetition configuration for case 2 matches the PUCCH repetition configuration/indication for case 1. Alternatively, it may be possible that PUCCH repetition for case 2 can be configured differently from case 1 in terms of any of various configuration details, such as number of repetitions, slot or sub-slot based repetition, applicable PUCCH resource(s), applicable PUCCH format(s), etc. In some instances, provided PUCCH repetition for case 2 can be configured differently from case 1, it may be possible that the PUCCH repetition configuration for case 2 (e.g., enable or disable, at least) is included in SIB configuration information.

It may be possible that a UE capability reporting framework is supported for indicating whether a UE supports PUCCH repetition for common PUCCH resource transmission before dedicated RRC configuration, according to various embodiments. In some embodiments, for example, it may be possible that a UE can report either that the UE supports both case 1 and case 2 PUCCH repetition for common PUCCH resource transmission before dedicated RRC configuration, or that the UE supports neither. Alternatively, it may be possible that a UE can independently report whether the UE supports both case 1 and/or case 2 PUCCH repetition for common PUCCH resource transmission before dedicated RRC configuration. In some embodiments, such UE capability reporting may be carried by msg1 and/or msg3 PUSCH transmission, e.g., during a RACH procedure.

In the following further exemplary embodiments are provided.

One set of embodiments may include a method, comprising: by a wireless device: receiving configuration information indicating that physical uplink control channel (PUCCH) repetition before dedicated PUCCH resource configuration is supported; and performing a PUCCH transmission with repetition before dedicated PUCCH resource configuration based at least in part on the configuration information.

According to some embodiments, the PUCCH transmission with repetition includes hybrid automatic repeat request (HARQ) acknowledgement (ACK) information for a message 4 of a random access channel (RACH) procedure.

According to some embodiments, the PUCCH transmission with repetition is performed after hybrid automatic repeat request (HARQ) acknowledgement (ACK) information is provided for a message 4 of a random access channel (RACH) procedure.

According to some embodiments, PUCCH repetition before dedicated PUCCH resource configuration is supported when physical downlink shared channel scheduling by downlink control information format 1_0 with cyclic redundancy check is scrambled by one or more of: cell radio network temporary identifier (C-RNTI); temporary C-RNTI (TC-RNTI); configured scheduling RNTI (CS-RNTI); or modulation and coding scheme C-RNTI (MCS-C-RNTI).

According to some embodiments, PUCCH repetition before dedicated PUCCH resource configuration is supported for one or more of: PUCCH format 0; or PUCCH format 1.

According to some embodiments, the configuration information configures one or more of: slot based PUCCH repetition before dedicated PUCCH resource configuration; or sub-slot based PUCCH repetition before dedicated PUCCH resource configuration.

Another set of embodiments may include an apparatus, comprising: a processor configured to cause a wireless device to: receive configuration information indicating that physical uplink control channel (PUCCH) repetition before dedicated PUCCH resource configuration is supported; and perform a PUCCH transmission with repetition before dedicated PUCCH resource configuration based at least in part on the configuration information.

According to some embodiments, the PUCCH transmission is performed in frequency division duplexing (FDD) spectrum, wherein repetitions of the PUCCH transmission are performed in multiple consecutive slots or sub-slots.

According to some embodiments, the PUCCH transmission is performed in time division duplexing (TDD) spectrum, wherein repetitions of the PUCCH transmission are performed in multiple consecutive slots or sub-slots with repetitions omitted when a slot or sub-slot has a duplexing direction conflict.

According to some embodiments, the PUCCH transmission is performed in time division duplexing (TDD) spectrum, wherein repetitions of the PUCCH transmission are performed in multiple consecutive slots or sub-slots that do not have a duplexing direction conflict.

According to some embodiments, the PUCCH transmission is performed in time division duplexing (TDD) spectrum, wherein to determine whether a slot or sub-slot has a duplexing direction conflict, one or more of a TDD-UL-DL-ConfigCommon field in ServingCellConfigCommonSIB or a TDD-UL-DL-ConfigCommon field in ServingCellConfigCommon is considered.

According to some embodiments, the PUCCH transmission is performed in time division duplexing (TDD) spectrum, wherein to determine whether a slot or sub-slot has a duplexing direction conflict, a "flexible" symbol is determined to have a duplexing direction conflict.

According to some embodiments, the PUCCH transmission is performed in time division duplexing (TDD) spectrum, wherein to determine whether a slot or sub-slot has a duplexing direction conflict, a "flexible" symbol is determined to not have a duplexing direction conflict.

According to some embodiments, the PUCCH transmission is performed in time division duplexing (TDD) spectrum, wherein when a PUCCH transmission slot or sub-slot has a duplexing direction conflict, the processor is further configured to cause the wireless device to perform one of, for the slot or sub-slot with the duplexing direction conflict: omit all symbols in the slot or sub-slot; omit all symbols after a first symbol of the slot or sub-slot with the duplexing direction conflict; or omit only symbols of the slot or sub-slot with the duplexing direction conflict.

According to some embodiments, the PUCCH transmission is performed in time division duplexing (TDD) spectrum, wherein when a PUCCH transmission slot or sub-slot has a duplexing direction conflict, the processor is further configured to cause the wireless device to perform one of, after the slot or sub-slot with the duplexing direction conflict: transmit any following repetitions for the PUCCH transmission without impact from the slot or sub-slot with the duplexing direction conflict; or omit all following repetitions for the PUCCH transmission.

According to some embodiments, the processor is further configured to cause the wireless to: provide wireless device capability information indicating whether the wireless device supports PUCCH repetition before dedicated PUCCH resource configuration for one or more of: PUCCH transmission for responding to a message 4 of a random access channel (RACH) procedure; or PUCCH transmission after responding to a message 4 of a RACH procedure.

Yet another set of embodiments may include a cellular base station, comprising: an antenna; a radio operably coupled to the antenna; and a processor operably coupled to the radio; wherein the cellular base station is configured to: transmit configuration information to a wireless device indicating that physical uplink control channel (PUCCH) repetition before dedicated PUCCH resource configuration is supported; and receive a PUCCH transmission with repetition from the wireless device before dedicated PUCCH resource configuration.

According to some embodiments, the configuration information further indicates one or more PUCCH repetition values for one or more PUCCH resource indexes for one or both of PUCCH transmission for responding to a message 4 of a random access channel (RACH) procedure or PUCCH transmission after responding to a message 4 of a RACH procedure.

According to some embodiments, the cellular base station is further configured to: provide downlink control information (DCI) scheduling the PUCCH transmission, wherein the DCI includes a PUCCH resource indicator field that indicates a repetition configuration for the PUCCH transmission.

According to some embodiments, the configuration information configures PUCCH repetitions for PUCCH transmission for responding to a message 4 of a random access channel (RACH) procedure and for PUCCH transmission after responding to a message 4 of a RACH procedure together.

According to some embodiments, the configuration information configures PUCCH repetitions for PUCCH transmission for responding to a message 4 of a random access channel (RACH) procedure separately from PUCCH repetitions for PUCCH transmission after responding to a message 4 of a RACH procedure.

According to some embodiments, the configuration information that configures PUCCH repetitions for PUCCH transmission for responding to a message 4 of a random access channel (RACH) procedure includes configuration parameters for one or more of: number of repetitions; slot or sub-slot based repetition; applicable PUCCH resource(s); or applicable PUCCH format(s), wherein the configuration information that configures PUCCH repetitions for PUCCH transmission after responding to a message 4 of a RACH procedure includes an indication of whether PUCCH repetitions for PUCCH transmission after responding to a message 4 of a RACH procedure is enabled, wherein if PUCCH repetitions for PUCCH transmission after responding to a message 4 of a RACH procedure is enabled, same configuration parameters are used as for PUCCH repetitions for PUCCH transmission for responding to a message 4 of a RACH procedure.

According to some embodiments, each of the configuration information that configures PUCCH repetitions for PUCCH transmission for responding to a message 4 of a random access channel (RACH) procedure and the configuration information that configures PUCCH repetitions for PUCCH transmission after responding to a message 4 of a RACH procedure includes configuration parameters for one or more of: number of repetitions; slot or sub-slot based repetition; applicable PUCCH resource(s); or applicable PUCCH format(s).

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processor configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:

by a wireless device:

receiving configuration information indicating that physical uplink control channel (PUCCH) repetition before dedicated PUCCH resource configuration is supported, wherein the configuration information configures sub-slot based PUCCH repetition before dedicated PUCCH resource configuration; and performing a PUCCH transmission with repetition before dedicated PUCCH resource configuration based at least in part on the configuration information.

2. The method of claim 1, wherein the PUCCH transmission with repetition includes hybrid automatic repeat request (HARQ) acknowledgement (ACK) information for a message 4 of a random access channel (RACH) procedure.

3. The method of claim 1, wherein the PUCCH transmission with repetition is performed after hybrid automatic repeat request (HARQ) acknowledgement (ACK) information is provided for a message 4 of a random access channel (RACH) procedure.

4. The method of claim 1, wherein PUCCH repetition before dedicated PUCCH resource configuration is supported when physical downlink shared channel scheduling by downlink control information format 1_0 with cyclic redundancy check scrambled by one or more of:

cell radio network temporary identifier (C-RNTI);

temporary C-RNTI (TC-RNTI);

configured scheduling RNTI (CS-RNTI); or modulation and coding scheme C-RNTI (MCS-C-RNTI).

5. The method of claim 1, wherein PUCCH repetition before dedicated PUCCH resource configuration is supported for one or more of:

PUCCH format 0; or

PUCCH format 1.

6. The method of claim 1, wherein the configuration information configures:

slot based PUCCH repetition before dedicated PUCCH resource configuration.

7. An apparatus, comprising:

a processor configured to cause a wireless device to:

receive configuration information indicating that physical uplink control channel (PUCCH) repetition before dedicated PUCCH resource configuration is supported, wherein the configuration information configures sub-slot based PUCCH repetition before dedicated PUCCH resource configuration; and perform a PUCCH transmission with repetition before dedicated PUCCH resource configuration based at least in part on the configuration information.

8. The apparatus of claim 7, wherein the PUCCH transmission is performed in frequency division duplexing (FDD) spectrum, wherein repetitions of the PUCCH transmission are performed in multiple consecutive slots or sub-slots.

9. The apparatus of claim 7, wherein the PUCCH transmission is performed in time division duplexing (TDD) spectrum, wherein repetitions of the PUCCH transmission are performed in multiple consecutive slots or sub-slots with repetitions omitted when a slot or sub-slot has a duplexing direction conflict.

10. The apparatus of claim 7, wherein the PUCCH transmission is performed in time division duplexing (TDD) spectrum, wherein repetitions of the PUCCH transmission are performed in multiple consecutive slots or sub-slots that do not have a duplexing direction conflict.

11. The apparatus of claim 7, wherein the PUCCH transmission is performed in time division duplexing (TDD) spectrum, wherein when a PUCCH transmission slot or sub-slot has a duplexing direction conflict, the processor is further configured to cause the wireless device to perform one of, for the slot or sub-slot with the duplexing direction conflict:

omit all symbols in the slot or sub-slot;

omit all symbols after a first symbol of the slot or sub-slot with the duplexing direction conflict; or omit only symbols of the slot or sub-slot with the duplexing direction conflict.

12. The apparatus of claim 7, wherein the PUCCH transmission is performed in time division duplexing (TDD) spectrum, wherein when a PUCCH transmission slot or sub-slot has a duplexing direction conflict, the processor is further configured to cause the wireless device to perform one of, after the slot or sub-slot with the duplexing direction conflict:

transmit any following repetitions for the PUCCH transmission without impact from the slot or sub-slot with the duplexing direction conflict; or omit all following repetitions for the PUCCH transmission.

13. The apparatus of claim 7, wherein the processor is further configured to cause the wireless to:

provide wireless device capability information indicating whether the wireless device supports PUCCH repetition before dedicated PUCCH resource configuration for one or more of:

PUCCH transmission for responding to a message 4 of a random access channel (RACH) procedure; or PUCCH transmission after responding to a message 4 of a RACH procedure.

14. A cellular base station, comprising:

an antenna;

a radio operably coupled to the antenna; and a processor operably coupled to the radio;

wherein the cellular base station is configured to:

transmit configuration information to a wireless device indicating that physical uplink control channel (PUCCH) repetition before dedicated PUCCH resource configuration is supported, wherein the configuration information configures sub-slot based PUCCH repetition before dedicated PUCCH resource configuration; and receive a PUCCH transmission with repetition from the wireless device before dedicated PUCCH resource configuration.

15. The cellular base station of claim 14, wherein the configuration information further indicates one or more PUCCH repetition values for one or more PUCCH resource indexes for one or both of PUCCH transmission for responding to a message 4 of a random access channel (RACH) procedure or PUCCH transmission after responding to a message 4 of a RACH procedure.

16. The cellular base station of claim 14, wherein the cellular base station is further configured to:

provide downlink control information (DCI) scheduling the PUCCH transmission, wherein the DCI includes a PUCCH resource indicator field that indicates a rep-etition configuration for the PUCCH transmission.

17. The cellular base station of claim 14, wherein the configuration information configures PUCCH repetitions for PUCCH transmission for responding to a message 4 of a random access channel (RACH) procedure and for PUCCH transmission after respond-ing to a message 4 of a RACH procedure together.

18. The cellular base station of claim 14, wherein the configuration information configures PUCCH repetitions for PUCCH transmission for responding to a message 4 of a random access channel (RACH) procedure separately from PUCCH repetitions for PUCCH transmission after responding to a message 4 of a RACH procedure.

19. The cellular base station of claim 18, wherein the configuration information that configures PUCCH repetitions for PUCCH transmission for responding to a message 4 of a random access channel (RACH) procedure includes configuration parameters for one or more of:

number of repetitions;

slot or sub-slot based repetition;

applicable PUCCH resource(s); or applicable PUCCH format(s), wherein the configuration information that configures PUCCH repetitions for PUCCH transmission after responding to a message 4 of a RACH procedure includes an indication of whether PUCCH repetitions for PUCCH transmission after responding to a message 4 of a RACH procedure is enabled, wherein if PUCCH repetitions for PUCCH transmission after responding to a message 4 of a RACH procedure is enabled, same configuration parameters are used as for PUCCH rep-etitions for PUCCH transmission for responding to a message 4 of a RACH procedure.

20. The cellular base station of claim 18, wherein each of the configuration information that con-figures PUCCH repetitions for PUCCH transmission for responding to a message 4 of a random access channel (RACH) procedure and the configuration infor-mation that configures PUCCH repetitions for PUCCH transmission after responding to a message 4 of a RACH procedure includes configuration parameters for one or more of:

number of repetitions;

slot or sub-slot based repetition;

applicable PUCCH resource(s); or applicable PUCCH format(s).

* * * * *